(12) United States Patent
Lambert

(10) Patent No.: US 9,143,319 B2
(45) Date of Patent: Sep. 22, 2015

(54) MECHANISM FOR MANAGING AUTHENTICATION DEVICE LIFECYCLES

(75) Inventor: Robert John Lambert, Cambridge (CA)

(73) Assignee: Certicom Corp., Mississauga, Ontario (CA)

( * ) Notice: Subject to any disclaimer, the term of this patent is extended or adjusted under 35 U.S.C. 154(b) by 19 days.

(21) Appl. No.: 13/822,944

(22) PCT Filed: Sep. 12, 2011

(86) PCT No.: PCT/CA2011/050550
§ 371 (c)(1),
(2), (4) Date: Mar. 13, 2013

(87) PCT Pub. No.: WO2012/040840
PCT Pub. Date: Apr. 5, 2012

(65) Prior Publication Data
US 2013/0170644 A1    Jul. 4, 2013

Related U.S. Application Data

(60) Provisional application No. 61/383,993, filed on Sep. 17, 2010.

(51) Int. Cl.
*H04L 29/06* (2006.01)
*H04L 9/08* (2006.01)
(Continued)

(52) U.S. Cl.
CPC .............. *H04L 9/0816* (2013.01); *G06F 21/34* (2013.01); *G06F 21/604* (2013.01); *G06F 21/81* (2013.01); *H04L 9/0891* (2013.01); *H04L 9/3234* (2013.01); *H04L 9/3268* (2013.01);
(Continued)

(58) Field of Classification Search
CPC ......... H04L 9/00; H04L 63/00; H04L 9/0816; G06F 21/00; G06F 21/34; G06F 21/81
USPC ........................................................ 380/277
See application file for complete search history.

(56) References Cited

U.S. PATENT DOCUMENTS 5,892,828 A    4/1999 Perlmann
6,134,660 A    10/2000 Boneh et al.
(Continued)

FOREIGN PATENT DOCUMENTS

EP    0725512 A2    7/1996
WO    WO 2006/059195 A1    6/2006

OTHER PUBLICATIONS

Yeow, L.; International Search Report from corresponding PCT Application No. PCT/CA2011/050550; search completed Dec. 19, 2011.

(Continued)

*Primary Examiner* — Chau Le
*Assistant Examiner* — Muhammad Chaudhry
(74) *Attorney, Agent, or Firm* — Jose Gutman; Fleit Gibbons Gutman Bongini & Bianco P.L.

(57) ABSTRACT

An authentication device is used to authenticate a component to a product using a secret key. The life cycle of the authentication device is controlled by selective deletion of the secret key. An attestation message is sent by the authentication device upon deletion of the secret key. Authentication devices from faulty components or over supply of the authentication devices ma}' be rendered inoperable and audited.

21 Claims, 6 Drawing Sheets

(51) Int. Cl.
  *G06F 21/34* (2013.01)
  *G06F 21/60* (2013.01)
  *G06F 21/81* (2013.01)
  *H04L 9/32* (2006.01)

(52) U.S. Cl.
  CPC ...... *H04L63/062* (2013.01); *G06F 2221/2105* (2013.01); *G06F 2221/2143* (2013.01)

(56) References Cited

U.S. PATENT DOCUMENTS

| | | | |
|---|---|---|---|
| 6,738,903 | B1 | 5/2004 | Haines |
| 2002/0157002 | A1* | 10/2002 | Messerges et al. ........... 713/155 |
| 2006/0010503 | A1 | 1/2006 | Inoue et al. |
| 2008/0077802 | A1 | 3/2008 | Richardson et al. |
| 2009/0006844 | A1* | 1/2009 | Wing et al. .................... 713/156 |
| 2009/0034736 | A1* | 2/2009 | French .......................... 380/278 |
| 2009/0075630 | A1* | 3/2009 | McLean ........................ 455/411 |
| 2009/0187766 | A1 | 7/2009 | Vuillaume et al. |
| 2010/0017867 | A1* | 1/2010 | Fascenda ......................... 726/9 |
| 2010/0172503 | A1 | 7/2010 | Neumann et al. |
| 2010/0268955 | A1* | 10/2010 | Ohno et al. .................... 713/171 |
| 2011/0010770 | A1 | 1/2011 | Smith et al. |
| 2011/0063093 | A1* | 3/2011 | Fung et al. .................. 340/10.52 |

OTHER PUBLICATIONS

Yanai, Y.; Supplementary Search Report from corresponding European Application No. 11827866.2; search completed Oct. 4, 2013.

* cited by examiner

MECHANISM FOR MANAGING AUTHENTICATION DEVICE LIFECYCLES

CROSS-REFERENCE TO RELATED APPLICATIONS

This application is a national entry of POT Application No. PCT/CA2011/050550, filed on Sep. 12, 2011, which claims priority from U.S. Provisional Application No. 61/383,993, filed on Sep. 17, 2010, the entire contents of each which are incorporated herein by reference.

TECHNICAL FIELD

The following relates to methods and apparatus to manage life cycles of authentication devices.

BACKGROUND

Many products incorporate components obtained from diverse sources. These components must be of a required quality and functionality and their source must therefore be assured. This is particularly critical where the components are an integral part of the overall product and can affect the performance of the product and the safety of the end user. Examples of such criticality include batteries used in computing and telecommunication devices, mechanical components used in aerospace and transport applications, and surgical tools used with medical imaging apparatus. Other applications where use of a counterfeit component may affect performance and cause collateral damage to the product include printer cartridges, memory cards and photographic lenses.

BRIEF DESCRIPTION OF THE DRAWINGS

Embodiments of different implementations will now be described, by way of example only and with reference to the accompanying drawings, in which.

DETAILED DESCRIPTION

Figure 1:
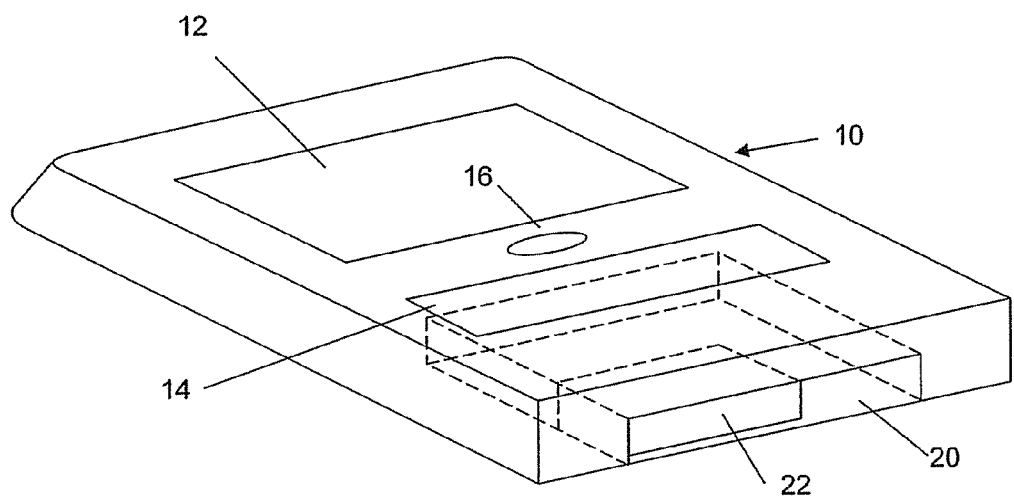
FIG. 1 is a representation of an end user product incorporating a component with an authentication device.

In order to ensure the components used are properly sourced, authentication devices are incorporated in to the components. When the component is used in the end product, the authentication device cooperates with the end product to authenticate the origins of the component. The authentication is effected using cryptographic protocols that require a secret to be embodied in the authentication device.

Typically, the authentication device, component, and end product are manufactured in distributed locations, which presents challenges in the management of the secrets and the authentication devices. Controlling the distribution of keys and auditing the production quantities is effective for the majority of situations that may occur. However, a particular issue arises when the component is to be scrapped, such as when it is found to be faulty, after the authentication device has been incorporated. In this case, the authentication device may be removed from the component and utilised with other, counterfeit, components, or the component, though it does not meet specifications, may enter the market as a counterfeit component.

The above problem is addressed by providing a mechanism that deletes a secret, used in the authentication of the component, from the authentication device and generates an attestation message, indicating that a secret has been deleted. The attestation message may then be forwarded to the audit authority to account for the scrapped authentication devices. The deletion of the secret ensures that the authentication device cannot be used to successfully authenticate other components.

Preferably, the secret is deleted prior to forwarding of the attestation message, and, as a further preference, the attestation message utilises the secret that is to be deleted.

The generation of the attestation message may be initiated by a password supplied on a per device basis or on a batch basis, and, to prevent inadvertent disabling of the component the attestation functionality may be switched off after incorporation in the product, The mechanism may be used with different cryptographic protocols, both symmetric key and asymmetric key.

In general terms, an authentication device is produced at an authentication device manufacturer (ADM) for incorporation in to a component to be supplied to an end user. The authentication device is supplied to a component manufacturer (CM), who combines the authentication device and component. The component is then supplied to the contracting company (CC) for use with the end product.

The authentication device, which is in the form of an integrated circuit having a secure memory and an logic unit (LU) to perform cryptographic operations, incorporates a secret value, generally referred to as a secret key, which is used to authenticate the component to the product. Information related to the secret key for each device may be supplied, together with a device identifying information to the contracting company. The information may be the secret key for a symmetric key protocol, or the corresponding public key for an asymmetric key protocol. The contracting company signs the received identifying information, and the authentication device public key for an asymmetric key protocol, to produce a device certificate. The device certificate is associated with the authentication device after it has left the authentication device manufacturer, and is used in the authentication of the component to the product.

The component manufacturer tests the component that includes the authentication device and, if it passes, supplies the component to the contracting company, or their agents (which may for example, assemble components into finished products) as requested. If the device fails the tests, or if excess components are produced, the component manufacturer may initiate a scrapping process that ensures the authentication device cannot be used to authenticate a component. A password is supplied to the authentication device that causes it to delete the key from its memory. The authentication device also uses the secret key to generate an attestation message, indicating that the secret key has been deleted. The attestation message is sent to the contracting company, or an audit authority for that company, who verifies the attestation message was produced using the device secret key. The contracting company is thus satisfied that the secret key has been deleted from the authorisation device. The authorisation device itself has no value as the secret key is deleted and cannot authenticate a component to the product.

More specifically, with reference to FIG. 1, a product, 10 is in the form of a telecommunication device, having a screen 12, a keypad 14, and a supplementary input device, such as a trackball or trackpad 16. The product 10 includes a communication module, not shown, allowing a user to exchange data and information over a communication channel, either wireless or land based. The device 10 may take many different forms and the above details are provided for exemplary purposes only.

The device 10 includes a battery 20, which is a component supplied by a component manufacturer (CM). The battery 20 has an authentication device 22 secured to it, which co-operates with the device 10, as will be described more fully below, to authenticate the origins of the authentication device 22.

Figure 2:
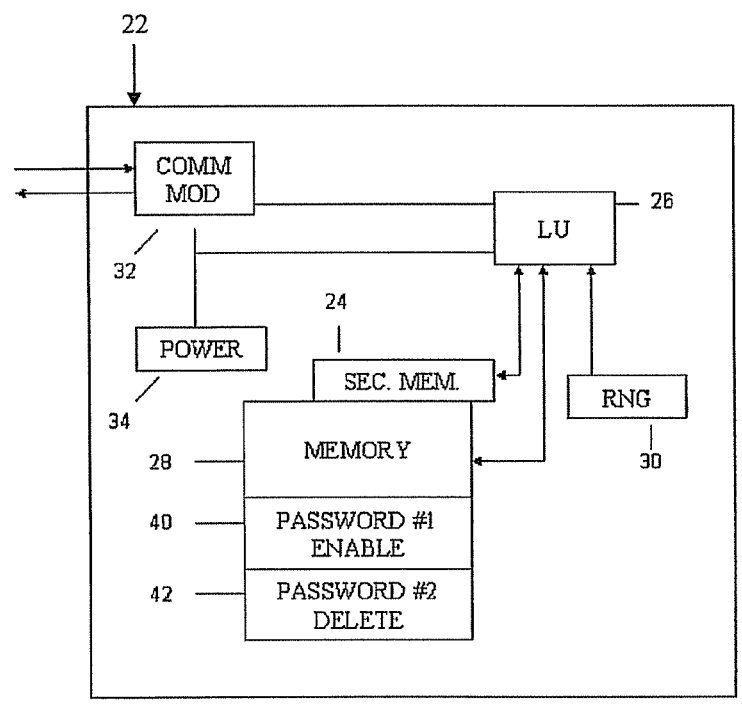
FIG. 2 is a diagrammatic representation of an authentication device shown in FIG. 1.

As may be seen more clearly in FIG. 2, the authentication device 22 is an integrated circuit including a secure memory 24 that interfaces with a logic unit (LU) 26. The LU 26 performs cryptographic operations under direction of nontransient computer readable instructions stored in a memory 28 or directly through state machines deployed in the authentication device hard ware. The secure memory 24 may be part of the memory 28 or separate from it, depending on the particular design implemented. The LU 26 includes a random number generator 30, to generate data strings that may be used as cryptographic keys or as random nonces needed for cryptographic algorithms. A communication module, 32, interfaces the authentication device with the product 10, and controls the flow of information between the product and the authentication device. A power source 34 is included if required to permit the authentication device to function, although external power may be supplied if a passive device is required, such as an RFID device.

Figure 3:
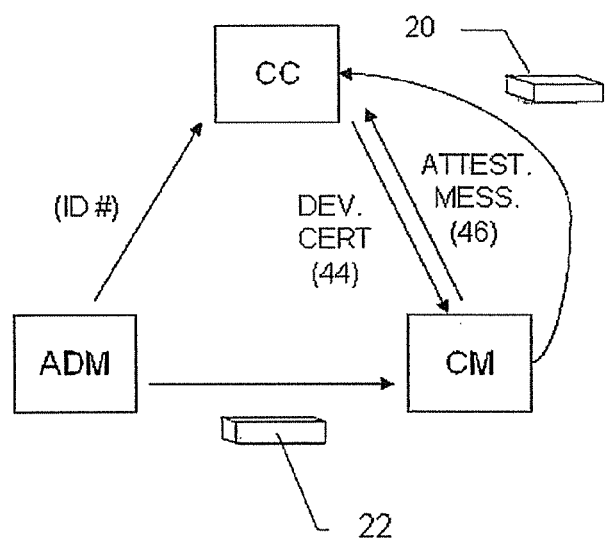
FIG. 3 is a diagram indicating the flow of data and devices in a manufacturing environment.

The secure memory 24 is used to store a data string representing a secure value, referred to as the secret key, d. The secret key d may be generated from the random number generator 30, or may be injected in to the memory 24 under secure controlled conditions, at the authentication device manufacturer (ADM) shown in FIG. 3.

The ADM is engaged in a manufacturing organisation consisting of the component manufacturer (CM) and the contracting company (CC). The role of the ADM is to manufacture the authentication devices 22, embed the secret key d and supply the authentication devices 22 to the CM.

The CM manufactures the components, a battery 20 in the example provided, and incorporates the authentication devices 22 in to the batteries 20. The battery 20 with authentication device 22 is then tested and supplied to the contracting company CC. The secure manufacture of the components requires exchange of data as well as physical elements between the ADM, CM and CC.

Figure 4:
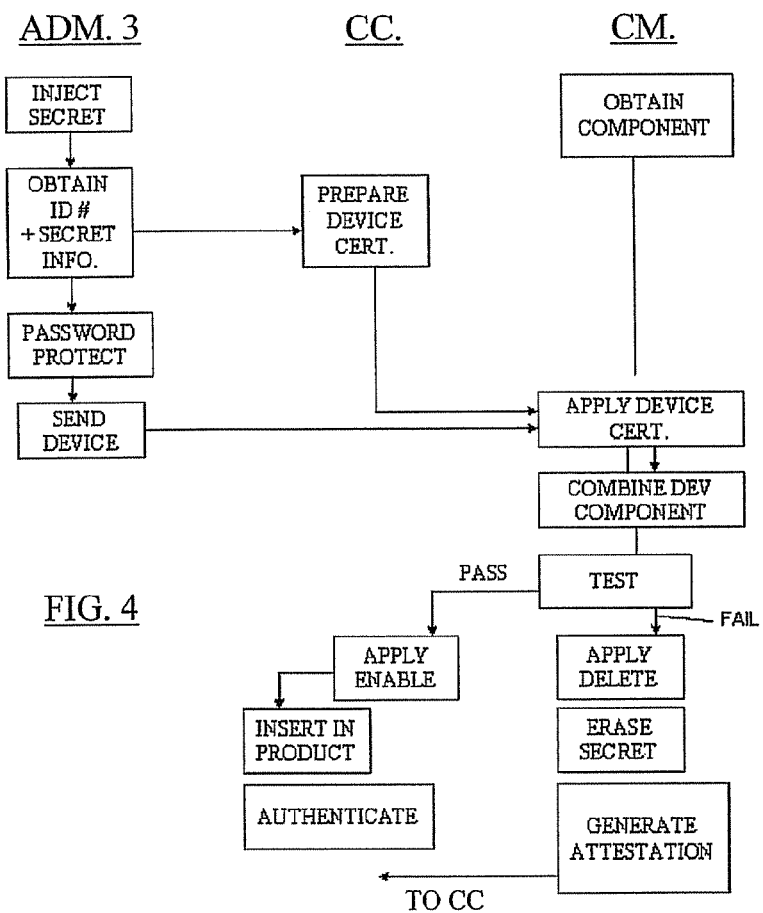
FIG. 4 is flow chart illustrating a process associated with FIG. 3.

Referring to FIG. 4, the secret key d is initially stored in the secure memory 24. Identifying information, such as an identification number, ID#, is also assigned to each authentication device 22 to identify uniquely each of the devices manufactured. Where the authentication device utilises public key cryptographic protocols, the LU 26 operates on the secret value, d, to obtain a corresponding public key D, which is stored in the memory 28.

The memory 28 also stores a pair of passwords, 40,42 identified as ENABLE and DELETE. The computer readable instruction set, or hardware state machine, includes a routine or mechanism to password protect the authentication device 22, so that it is inoperable until the ENABLE password is used. The DELETE password is used to generate an attestation message as will be described below. The passwords may be changed from device to device, if necessary for the particular application, or may be a common password for a batch or particular ADM.

After the authentication devices 22 are provisioned with the respective secret key d, the ADM transmits the identification information, ID#, to the CC in a secure manner. The ADM will also send information related to the secret key d. Where the protocols used are symmetric key protocols, the information includes its secret key, which is sent to the contracting company in a secure manner using one of a number of available key transport protocols. Where public key protocols are used, the authentication device 22 forwards the corresponding public key D that is derived from the secret key d to the CC.

The CC uses his private key, c, to sign a message including the identification and, where applicable, the public key D, to provide a device certificate, 44, for each authentication device 22. The device certificates 44 are forwarded to the contracted manufacturer, CM, to be attached to the corresponding authentication device, 22. The device certificates 44 are not sent to the ADM, so the ADM does not at any time have a fully provisioned authentication device 22, or the ability to create one.

The ADM forwards the authentication devices 22 to the contracted manufacturer CM with the password protection enabled. In this way, even though the devices 22 do not have the device certificates 44 added, and so have little value, they are also inoperable and theft is discouraged.

Upon receipt of the authentication devices 22, the contracted manufacturer, CM, applies the password ENABLE to activate the authentication device 22 and attaches the device certificate 44. The authentication device 22 is then secured to the component 20, in this example a battery, supplied to or manufactured by the contracted manufacturer CM. The completed component 20 is tested to ensure proper performance, and those accepted are sent to the contracting company CC for incorporation with the product 10.

When the component 20 is assembled in the product, the device certificate 44 is used to authenticate the component 20. The device certificate 44 may be verified using the public key C corresponding to the signing key, c of the contracting company. Where public key protocols are utilised, a challenge response protocol may be used to require the authentication device 22 to sign a random message using the secret key, d. The signed message can be verified by the product 10 using the authenticated public key D contained in the device certificate.

Other verification protocols commonly used to authenticate components can of course be used.

Where a component 20 fails the test, or when the contracting company CC indicates that no further components 20 are required, it is necessary to scrap the authentication devices 22, i.e. render them unable to authenticate a component. The CM initiates the scrapping by applying the second password DELETE. Upon receiving the password DELETE through the communication module 32, the LU 26 invokes a set of operations to delete the secret key, d, from the secure memory 24 and prepare an attestation message 46 that involves the secret key, d. The attestation message 46 is sent to the contracting company CC to evidence the destruction of the secret key d. As the CM does not have access to the secret key of the authentication devices 22, it cannot prepare bogus attestation messages, and accordingly must provide an accurate accounting of each of the authentication devices.

The generation of the attestation message can be performed in a number of different ways, depending on the protocols being implemented.

Figure 5:
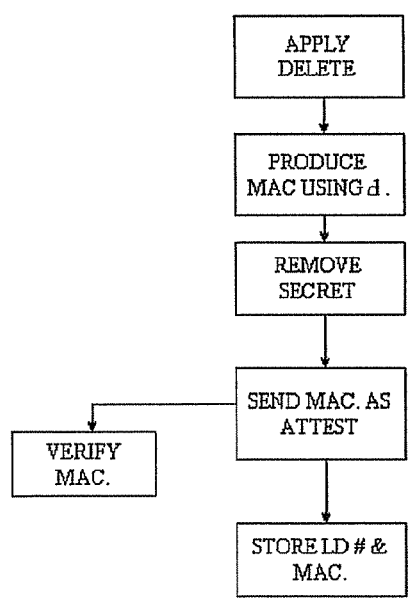
FIG. 5 illustrates in greater detail the process shown in FIG. 4 when utilising a symmetric key cryptographic protocol.

A first example using a symmetric key protocol is shown in FIG. 5. Upon receipt of the password DELETE, the LU 26 produces a MAC (message authentication code) using the secret key d. The MAC is a keyed hash function using the secret key d as the key and the password as the message. Alternatively, the message can be a specific message intended to indicate that the secret key d is deleted, and may include device specific information, such as the ID#.

After generating the MAC, the LU 26 deletes the secret key d from the secure memory 24.

Once the secret key is deleted, the attestation message 46 including the MAC, is sent to the contracting company, CC. The contracting company verifies the MAC using its copy of the symmetric key and upon verification accepts that the authentication device 22 has been disabled.

It is preferred that the identifying information and the attestation message are stored in the memory 28 of the authentication device 22 so that subsequent audits may be performed. However, as the secret key d is deleted, the authentication devices 22 cannot be used to authenticate a product 10.

Figure 6:
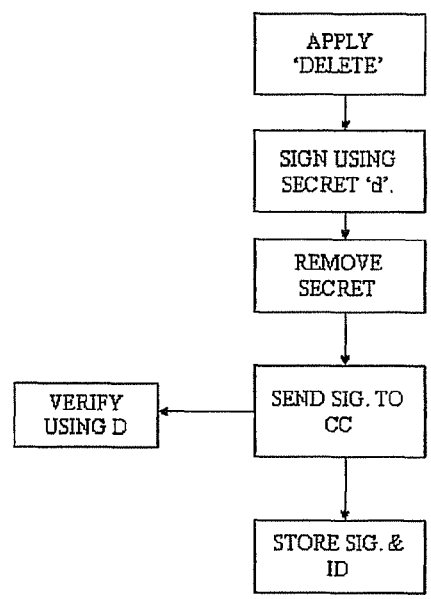
FIG. 6 is a flow chart similar to FIG. 5 utilising asymmetric key cryptographic protocols, and, FIG. 7 is a specific example of the process shown in FIG. 5, utilising public key elliptic curve cryptography.

The procedure used for asymmetric protocols is shown in FIG. 6. In this embodiment, the password DELETE is applied and the LU utilises the secret key d to sign the password, or a specific message to indicate deletion of the secret key. After signing, the secret key d is deleted from the secure memory 24 and the attestation message 46, including the signature, is forwarded to the contracting company CC. The contracting company CC may verify the signature in the attestation message 46 to confirm the deletion. Alternatively, a third party auditor may use the device certificate to verify the signature and confirm that the secret is deleted.

Cryptographic operations other than signatures can be used to produce an attestation message 46. For example, the CM may provide a contribution to a shared secret to the authentication device 22 and the authentication device 22 uses the secret key d and the contribution from the CM to combine the password and the shared secret to obtain the attestation message 46. The authentication device 22 may use a key derivation function, cryptographic hashing, or a MAC to produce the attestation message, which can be verified by the contracting company CC using publicly available information.

Figure 7:
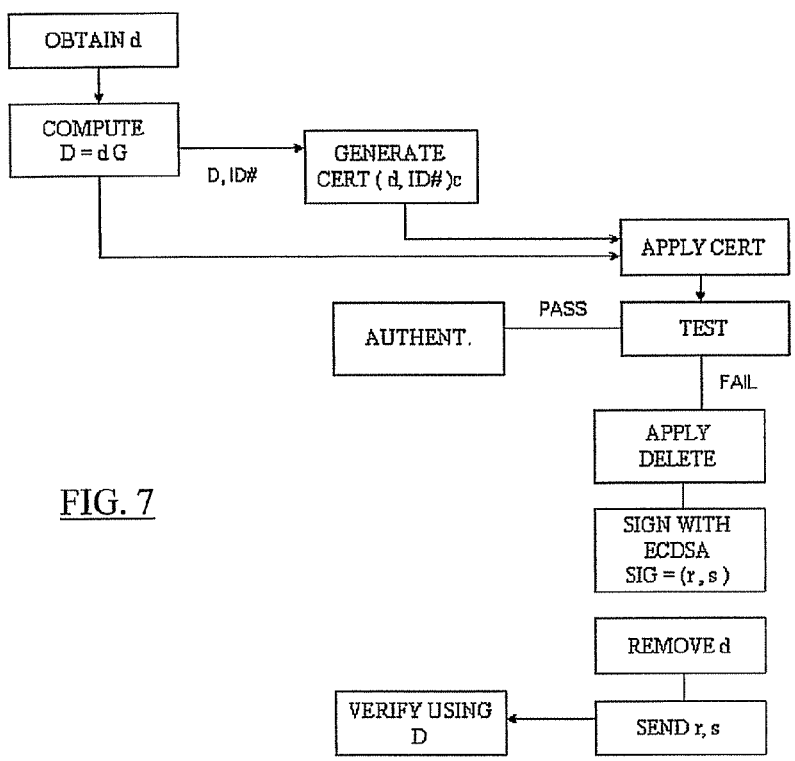

A specific example of an asymmetric key protocol is shown in FIG. 7 utilising elliptic curve cryptography. The cryptographic system utilises an elliptic curve group defined over a finite field. The group has a generating point G that generates each of the elements of the group. The group operation is usually denoted additively so an integer d used as a private key has a corresponding public key D=dG, which is a point on the elliptic curve.

The integer d is provided to the authentication device 22 as described above and the LU computes the point multiple dG to use as the public key D, which is then stored in the memory 28. The public key D is forwarded to the contracting company CC, who signs it using its private key c. The signature acts as the device certificate 44. Preferably, the device identifying information, ID#, is included in the device certificate 44. The device certificate can thus be verified using the public key C=cG, which is published by the contracting company CC.

The device certificate is attached to the authentication device 22, and if the device passes the test process, the device certificate and private key are used to authenticate the component.

If the device is to be scrapped, the password DELETE is applied to the authentication device 22. An ECDSA signature protocol is then performed using the password, or other message, as the input. The LU uses the random number generator 30 to obtain a session private key, k, produces a corresponding session public key K=kG and converts the x coordinate of the session key K to an integer to provide a first signature component, r.

The LU then computes the second signature component s in the form $1/k[h(m)+dr]$ where m is the password or related message and h(m) is a cryptographic hash of the message m.

The signature (r,s) is returned to the contracting company CC, after the secret key d is deleted, who can verify the signature using the known message and the public key D, together with the signature (r,s).

Another very suitable elliptic curve signature method that may be used by the authentication device 22 device to sign challenges the password is the ECPVS as adopted in ANSI/x9×9.92-1-2009. One advantage of using the ECPVS is it avoids the inversion required in ECDSA, which adds cost to the authentication device, and is a potential leakage point for the ephemeral key k.

Elliptic curve protocols may also be used without a signature. For example, the scrapping password may be embedded into C, a point on the curve. This example requires that the ADM has transmitted the asymmetric secret d securely to the CC. The point C embeds in its coordinates, the scrapping password, for example, as a prefix of Cx, the x-coordinate of C. The scrapping password itself should be long enough that the CM could not reasonably compute a point C containing the scrapping password in a way that CM would know the discrete logarithm of C. For example, if a 160-bit elliptic curve is used, embedding a scrapping password of 80 bits into a point C in the cyclic group generated by G and determining the discrete logarithm c would be cryptographically difficult for the CM, for suitably chosen elliptic curve parameters. The authentication device would, after deleting d, then return dC or perhaps f(dC,I), where f( ) is a deterministic function and I is other information known to the CC. This is a public-key attestation of scrapping. Preferably a message authentication code is used for f( ) such as HMAC employing dC as the key. The CC, knowing d, can check if dC or f(dC,I) is correct, and can thus verify that the authentication device produced the attestation message.

Another possibility embeds a public key S of the CC (or its agent) into the authentication device, where S=sG. In this case, the attestation message is a function of the shared key K=dS=sD, that is f(K,I), where f( ) is a deterministic function and I is other information known to the CC, and typically containing information identifying the authentication device. In this example, the CC will not need to know the device private key d.

A further enhancement provides for scrapping commands which are specific to a specific device with private key d. A first possibility employs public-key signatures on the scrapping command, allowing the device to authenticate the sender to a known public key before scrapping its secrets.

As a second possibility, when personalizing the device, the ADM calculates $C_0=(d^{-1} \bmod n)A$, where A is a point that is recognized to connote a specific action which the authentication device will perform, in this case, to prepare to scrap the authentication device. The action point A may embed a specific substring in one of its coordinates, and this substring may have a short specification, for example, the upper half of the x coordinate of A may be required to be 0. It is important to choose the form of A carefully, so that it is infeasible to determine the discrete logarithm of A.

To scrap the authentication device, the CM would now need to first supply $C_0$ to the authentication device. The authentication device, noticing that $A=dC_0$ had a specific form, would enter the scrapping mode where the next communication delete the secret key.

In the scrap mode, when C is provided to the authentication device, it will scrap the private key and provide the attestation. If the authentication device is not in the scrap mode, neither scrapping nor production of the attestation will be performed.

It will be appreciated that in each of the above examples, a password is used to initiate deletion of the secret used to authenticate the correspondent, and that an attestation message is generated using the secret.

Although described in the context of a telecommunication device, the authentication device could be used with other components, for example to authenticate a bearing used in an aircraft engine or other service critical components.

Although the above description contemplates appending the device certificate prior to testing, it will be appreciated that the device certificate may be appended after the initial testing, thereby reducing the number of non functional end products containing valid certificates. The certificates could then be metered by the CC to the CM on a charge per certificate basis to further discourage overproduction.

It is possible to use a unique scrap password for each authentication device, or a common password for a collection of devices, such as those produced in a particular batch or by a particular ADM. Using unique passwords for each device requires the passwords and device authentication information to be correlated and maintained by the CM.

It is also desirable to disable the DELETE password functionality after the component is supplied to the contracting company to inhibit inadvertent or malicious deletion of the secret key d.

The invention claimed is:

1. A method of disabling an authentication device having a secret key used to authenticate a component to a product, the authentication device comprising a logic unit interfaced with a memory that stores the secret key, the authentication device fabricated suitable for being physically secured to the component that is used by the product, the authentication device for communicatively cooperating with the product to authenticate the component to the product, said method comprising:
   receiving, with the logic unit communicating through a communication interface of said authentication device, a password requesting deletion of the secret key from the memory;
   initiating deleting, with the logic unit and based on determining that the received password matches a value stored in a first memory of said authentication device, said secret key from said memory of said authentication device preventing said secret key from being used by the authentication device to authenticate a component to a product;
   preparing, with the logic unit performing cryptographic operations using at least the secret key, an attestation message that indicates said secret key is deleted from said memory of said authentication device, said attestation message comprising information that is cryptographically verifiable that said attestation message was prepared by the logic unit of the authentication device; and
   deleting, with the logic unit, said secret key from said memory of said authentication device, and outputting through a communication interface of said authentication device said attestation message.

2. The method of claim 1 wherein said attestation message is prepared prior to deletion of said secret key.

3. The method of claim 1 wherein said attestation message is outputted subsequent to deletion of said secret key, and wherein a copy of said attestation message is stored in said memory of said authentication device.

4. The method of claim 1 wherein said secret key is used with the logic unit to encrypt said attestation message.

5. The method of claim 1 wherein said secret key operates upon a message indicative of deletion of said secret key to prepare said attestation message.

6. The method of claim 5 wherein said secret key signs said message indicative of deletion using a cryptographic signature protocol.

7. The method of claim 6 wherein said cryptographic signature protocol is a public signature protocol.

8. The method of claim 7 wherein said attestation message includes a certificate of a public key corresponding to said secret key.

9. The method of claim 8 wherein deletion of said secret key is initiated by application of the received password and said attestation message indicative of deletion comprises said received password.

10. The method of claim 1, further comprising:
    cryptographically authenticating, with the logic unit, a sender of the received password requesting deletion of the secret key from the memory.

11. An authentication device for authenticating a component to a product using a secret key, the authentication device comprising a logic unit interfaced with a memory that stores the secret key, the authentication device fabricated suitable for being physically secured to the component that is used by the product, the authentication device for communicatively cooperating with the product to authenticate the component to the product, and at least one of
    the memory storing computer executable instructions which, responsive to being executed by the logic unit cause the logic unit to perform operations; and
    the logic unit comprising state machines deployed in the authentication device hardware which responsive to execution of the state machines causes the logic unit to perform operations,
the operations comprising:
    receiving, with the logic unit communicating through a communication interface of said authentication device, a password requesting deletion of the secret key from the memory preventing said secret key from being used by the authentication device to authenticate the component to the product;
    preparing, with the logic unit performing cryptographic operations using at least the secret key, an attestation message that indicates said secret key is deleted from said memory of said authentication device, said attestation message comprising information that is cryptographically verifiable that said attestation message was prepared by the logic unit of the authentication device;
    deleting, with the logic unit, said secret key from said memory of said authentication device preventing said secret key from being used by the authentication device to authenticate a component to a product; and
    outputting through a communication interface of said authentication device said attestation message.

12. A non-transitory computer readable medium for disabling an authentication device having a secret key used to authenticate a component to a product, the authentication device comprising a logic unit interfaced with a memory that stores the secret key, the authentication device for communicatively cooperating with the product to authenticate the component to the product, the computer readable medium comprising computer executable instructions which, responsive to being executed by the logic unit, cause the logic unit to perform operations comprising:

initiating, with the logic unit and based on the authentication device receiving at least a password requesting deletion of the secret key, deletion of said secret key from said memory of said authentication device preventing said secret key from being used to authenticate the component to the product;

preparing, with the logic unit performing cryptographic operations using at least the secret key, an attestation message that indicates said secret key is deleted from said memory of said authentication device, said attestation message comprising information that is cryptographically verifiable that said attestation message was prepared by the logic unit of the authentication device; and deleting, with the logic unit, said secret key from said memory of said authentication device preventing said secret key from being used by the authentication device to authenticate a component to a product; and outputting through a communication interface of said authentication device said attestation message.

13. A method of verifying deletion of a secret key from an authentication device to prevent said secret key from being used by the authentication device to authenticate a component to a product, the authentication device comprising a logic unit interfaced with a memory that stores the secret key, the authentication device suitable for being physically secured to a component that is used by the product, the authentication device for communicatively cooperating with the product to authenticate the component to the product, said method comprising:

receiving, with a verification device, an attestation message from the authentication device, said attestation message comprising cryptographic information that is cryptographically verifiable that said attestation message was prepared by the logic unit performing cryptographic operations using at least the secret key; and identifying information that identifies the authentication device; and verifying, with the verification device performing cryptographic operations at least on the cryptographic information of the attestation message, that the attestation message was prepared by the logic unit of the authentication device and the received attestation message indicating that based on the authentication device having received at least a password requesting deletion of the secret key, the logic unit deleted said secret key from said memory of said authentication device, preventing said secret key from being used by the authentication device to authenticate a component to a product.

14. A method of determining a life cycle of an authentication device having a secret key used by the authentication device to authenticate a component to a product, the authentication device comprising a logic unit interfaced with a memory that stores the secret key, the authentication device suitable for being physically secured to a component that is used by the product, the authentication device for communicatively cooperating with the product to authenticate the component to the product, said method comprising:

receiving said authentication device having said secret key previously embedded in said memory;

receiving a device certificate associated with said authentication device, said device certificate having been previously produced and cryptographically signed, said device certificate comprising at least identifying information that identifies uniquely the authentication device:

receiving, with the logic unit communicating through a communication interface of said authentication device, a password requesting deletion of the secret key from the memory;

generating, with the logic unit performing cryptographic operations using at least the secret key, an attestation message that indicates said secret key is deleted from said memory of said authentication device, said attestation message comprising information that is cryptographically verifiable that said attestation message was prepared by the logic unit of the authentication device; and deleting, with the logic unit, said secret key from said memory, preventing said secret key from being used by the authentication device to authenticate a component to a product; and outputting through a communication interface of said authentication device said attestation message.

15. The method of claim 14
further comprising:
physically securing the authentication device to a component that is used by the product.

16. The method of claim 14 wherein the generating comprises:

generating, with the logic unit performing cryptographic operations using said secret key upon a message indicative of deletion of said secret key, the attestation message that indicates said secret key is deleted from said memory of said authentication device.

17. The method of claim 16 wherein the logic unit performing cryptographic operations uses said secret key to sign said message indicative of deletion using a cryptographic signature protocol.

18. The method of claim 17 wherein said cryptographic signature protocol is a public signature protocol.

19. The method of claim 18 wherein said attestation message includes a certificate of a public key corresponding to said secret key.

20. The method of claim 14 wherein said message indicative of deletion is said received password.

21. The method of claim 14, wherein the received device certificate having been previously cryptographically signed by an entity responsible for the product, including the component being an authentic integral part of the product.

\* \* \* \* \*